United States Patent
Bradshaw

Patent Number: 5,735,998
Date of Patent: Apr. 7, 1998

[54] LAMINATING AND ADHESIVE TRANSFER APPARATUS

[75] Inventor: Franklin C. Bradshaw, Scottsdale, Ariz.

[73] Assignee: Xyron, Inc., Scottsdale, Ariz.

[21] Appl. No.: 748,982

[22] Filed: Nov. 14, 1996

Related U.S. Application Data

[63] Continuation of Ser. No. 354,222, Dec. 12, 1994, Pat. No. 5,580,417, which is a continuation-in-part of Ser. No. 247,003, May 20, 1994, Pat. No. 5,584,962.

[51] Int. Cl.⁶ .............................................. B32B 31/00
[52] U.S. Cl. .......................... 156/495; 156/522; 156/555; 100/176; 242/156; 242/419.9
[58] Field of Search ................................... 156/229, 494, 156/495, 510, 522, 540, 541, 542, 555, 582, 583.1; 100/155 R, 176; 425/363; 242/156, 419.8, 419.9

[56] References Cited

U.S. PATENT DOCUMENTS

| | | | |
|---|---|---|---|
| 2,647,299 | 8/1953 | Thomas | 492/47 X |
| 3,027,285 | 3/1962 | Eisner et al. | 156/522 X |
| 3,309,983 | 3/1967 | Dresser | 156/555 X |
| 3,737,359 | 6/1973 | Levitan | 156/522 |
| 3,901,758 | 8/1975 | Humphries | 156/499 |
| 3,944,455 | 3/1976 | French | 156/361 |
| 4,151,900 | 5/1979 | Kirwan | 188/174 |
| 4,387,000 | 6/1983 | Tancredi | 156/555 X |
| 4,619,728 | 10/1986 | Brink | 156/555 |
| 5,163,349 | 11/1992 | Takagi et al. | 156/510 X |
| 5,279,697 | 1/1994 | Peterson et al. | 156/368 |
| 5,480,509 | 1/1996 | Matsuo et al. | 156/522 |
| 5,571,368 | 11/1996 | Barge | 156/359 |
| 5,580,417 | 12/1996 | Bradshaw | 156/495 |
| 5,584,962 | 12/1996 | Bradshaw et al. | 156/495 |

Primary Examiner—James Sells
Attorney, Agent, or Firm—Reid & Priest LLP

[57] ABSTRACT

A multi-purpose laminating and adhesive transfer apparatus having a frame supporting rotatably engaging nip rollers which define a nip area. A replaceable cartridge is insertable into the frame and has upper and lower feed rolls which may be a laminate, film, or paper, or an adhesively coated film, or a film having an affinity for adhesive. The frame includes an open front for receiving the cartridge and a rear wall, and the cartridge includes an open rear in substantial alignment with the open front of the frame. The cartridge also includes a top wall, a bottom wall, and a front wall, the open rear providing access to the upper and lower feed rolls and loading of material from the upper and lower feed rolls to the nip rollers. The front wall of the cartridge has an opening therein in alignment with the nip area.

16 Claims, 3 Drawing Sheets

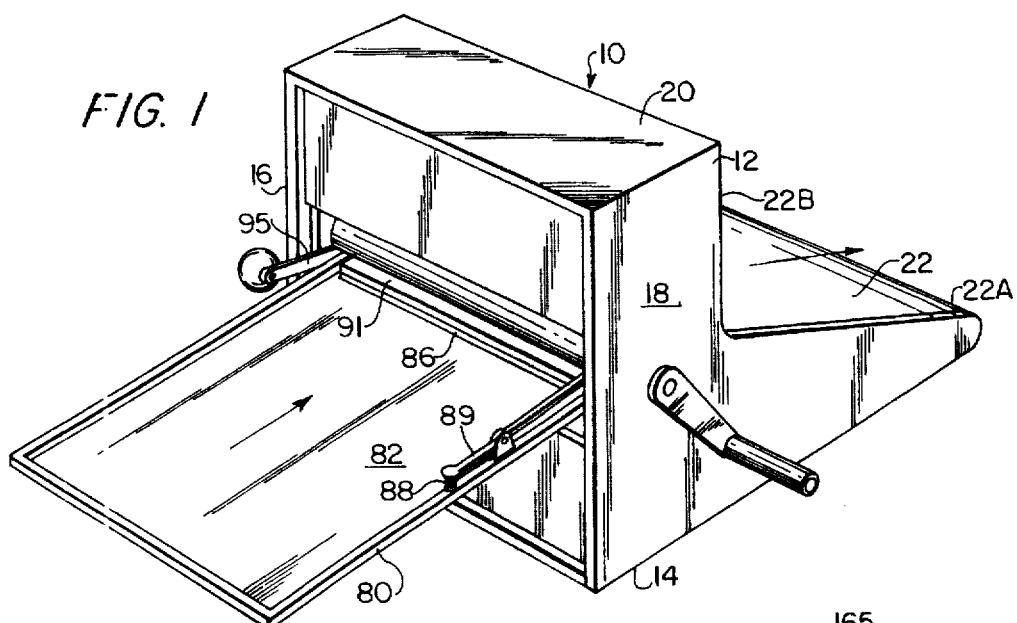
FIG. 1
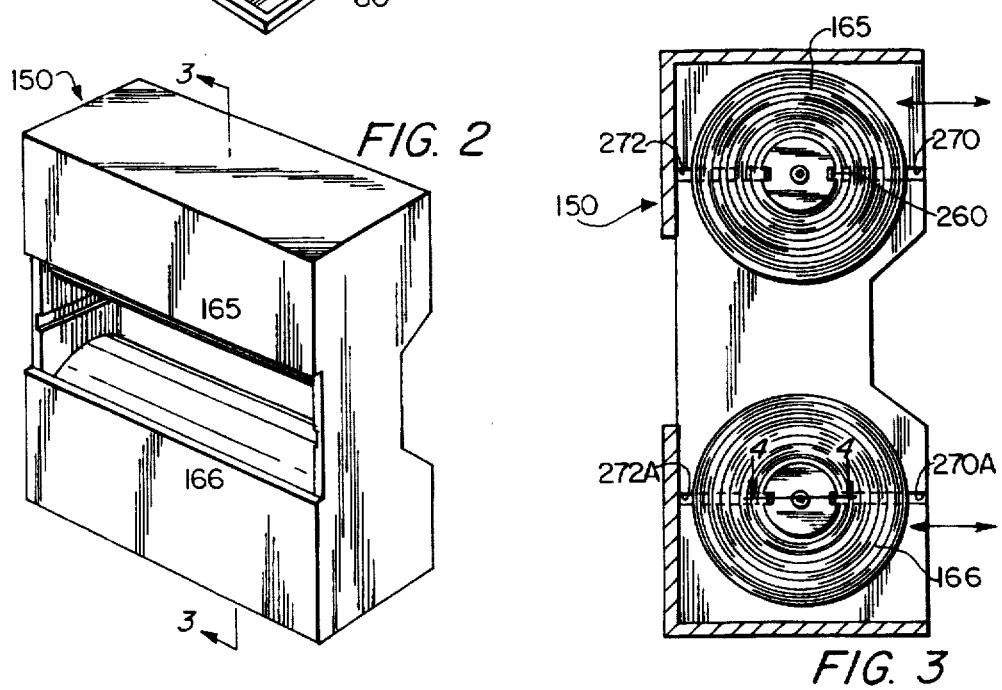
FIG. 2
FIG. 3
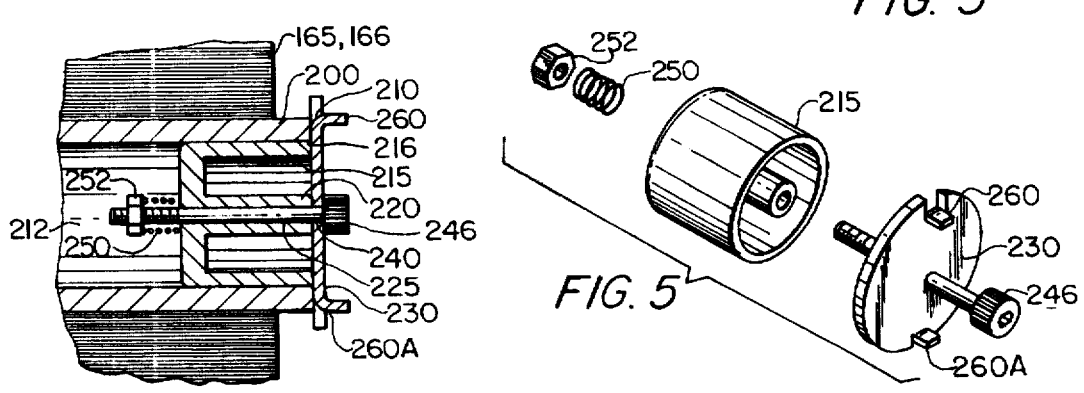
FIG. 4
FIG. 5

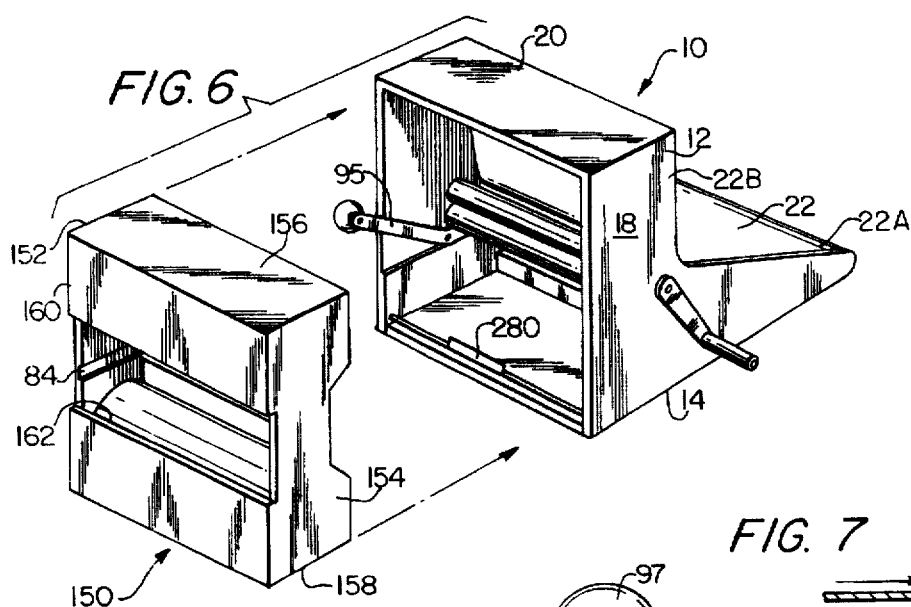
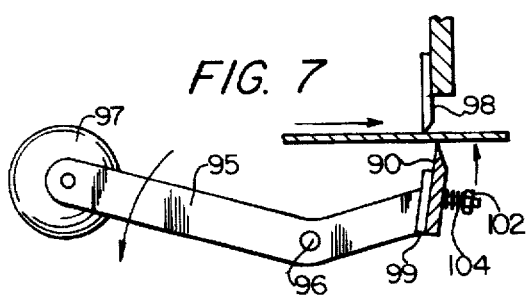
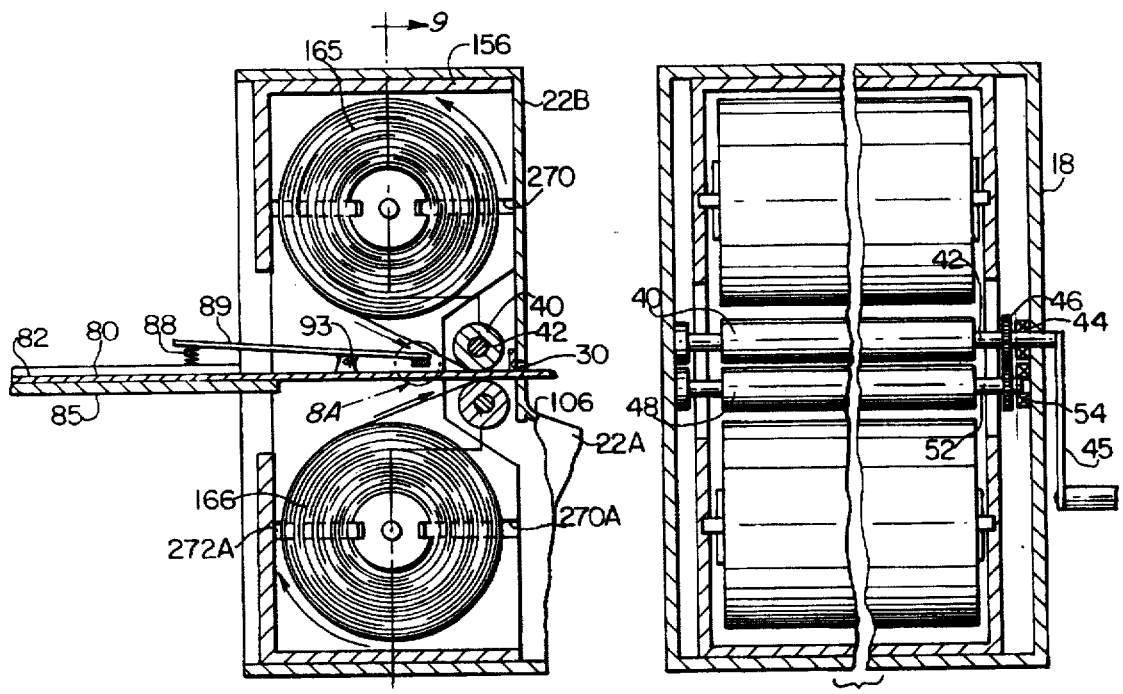
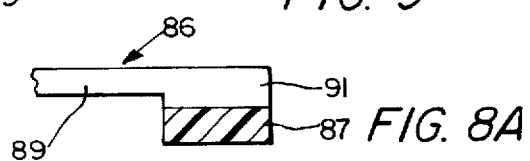

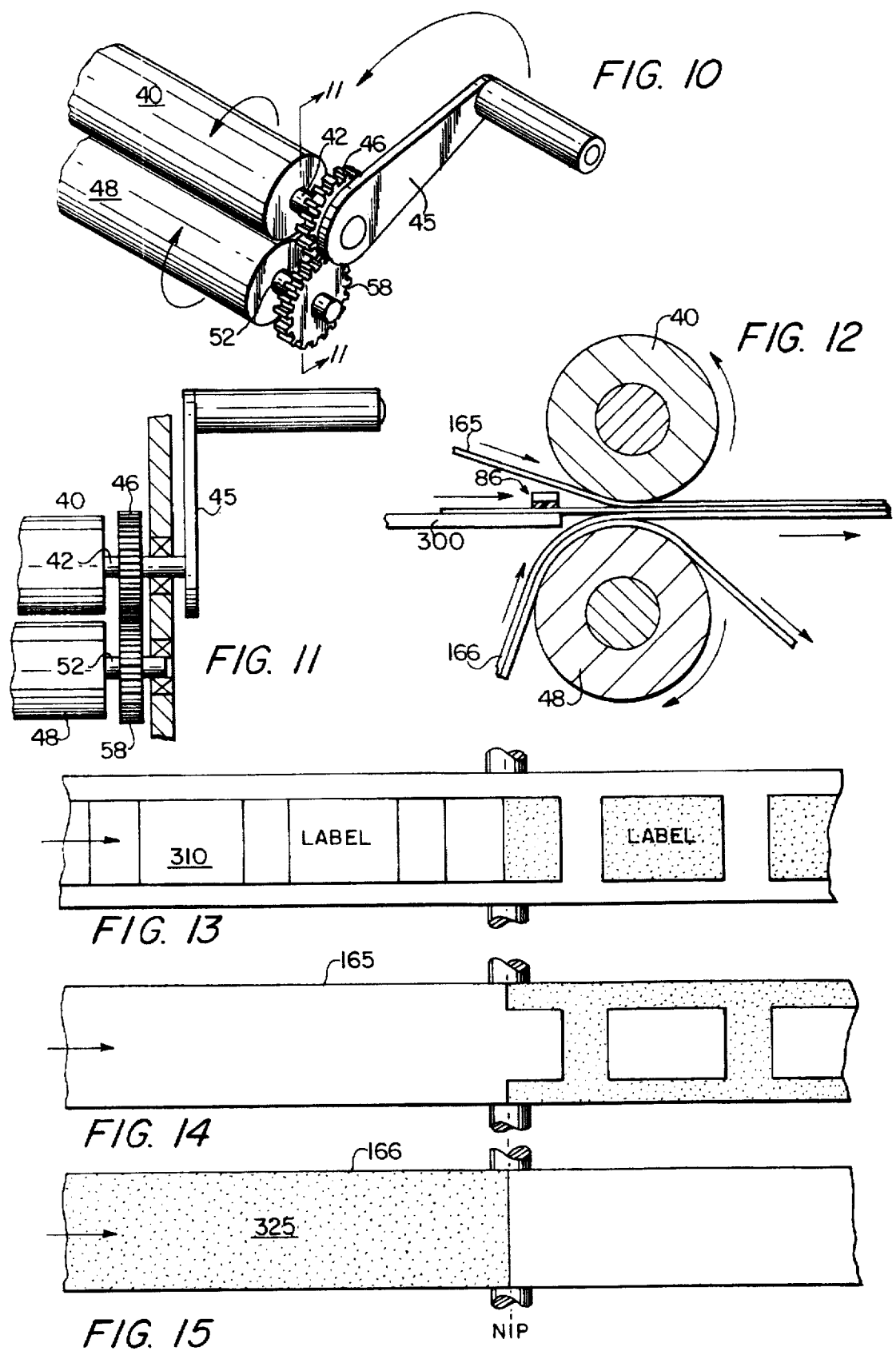

LAMINATING AND ADHESIVE TRANSFER APPARATUS

The present invention is, a continuation of application Ser. No. 08/354,222, filed Dec. 12, 1994, entitled "Laminating and Adhesive Transfer Apparatus," U.S. Pat. No. 5,580,417 which is a continuation-in-part of application Ser. No. 08/247,003, filed May 20, 1994, entitled "Laminating and Adhesive Transfer Apparatus" U.S. Pat. No. 5,584,962.

FIELD OF THE INVENTION

The present invention relates to an apparatus for laminating items and which apparatus will also transfer adhesives to substrates for purposes of producing articles such as labels and-sticker.

BACKGROUND OF THE INVENTION

It is common practice to protect documents and other items such as cards by encasing them in clear plastic coverings. Various products known as protectors are available for this purpose. Another common way of protecting documents and similar items is to laminate them. Lamination involves sealing the document or item between oppositely applied transparent films and lamination is commonly applied to such items as driver's licenses, identification cards, membership cards and the like.

Another operation that is often applied to documents and papers is that of adhesive transfer. Adhesive transfer is an operation that is used to make articles such as labels and stickers. One manner of producing such labels is to print the labels on blanks provided for this purpose. The blanks generally have an adhesive backing and are secured to a liner from which they may be peeled at the time of use. Computer systems are available that have the capability of printing labels on liner label stock provided for this purpose. This manner of making labels or stickers is expensive and further is limiting in that the printed material must be adapted to the physical size or confines of the label or sticker carried on the liner. This limits the information and creativity that may be incorporated in label making.

Based on the foregoing, there exists a need for a simple multi-purpose apparatus which can both serve to apply laminates to documents and papers and which will also serve to apply adhesive, including dry adhesives, to materials of various sizes so a wide variety of labels and stickers may be produced. The apparatus of the present invention can apply clear plastic laminates to master substrates of various sizes and can also transfer adhesive to substrates of various sizes not being limited by length. Adhesive transfer can be applied to either surface of the item as required. The apparatus can also apply dry adhesives from double sided release coated liners to a substrate.

SUMMARY OF THE INVENTION

Briefly, in accordance with the present invention, a multi-purpose laminating and adhesive transfer apparatus is provided which has a frame or housing with mounting means for receiving a cartridge which is insertable to supply material to perform the necessary laminating or adhesive transfer operation. The cartridge has a box-like housing in which upper and lower supply rolls containing webs of laminating or adhesive transfer material are rotatively secured. The rolls have tensioning caps which can be adjusted to prevent the supply rolls from overrunning as they pay-out material. The caps are pre-set in accordance with the operation being performed and the characteristics of the material. The tensioning caps may be pre-set by the material supplier at the time they are inserted into the cartridge. The user selects the cartridge appropriate to the operation to be performed.

First and second nip rollers extend transversely in the housing at a location intermediate the cartridge supply rollers. The nip rollers have a resilient coating and engage one another or are slightly spaced-apart in parallel relationship to one another. Preferably the lower nip roller is displaced forwardly from the upper nip roller in the direction of the cartridge. An actuator, which may be powered or may be manual such as a hand crank, is provided for driving or rotating at least one of the nip rollers which, in turn, drives the other roller.

A feed tray is removably mountable to the housing to facilitate feeding the article to be processed. Preferably the feed tray is removably secured in a general horizontal location aligned with the nip. The feed tray carries a transversely extending guide and wiper which smooths, cleans and positions the master fed along the tray. A discharge opening is provided at the rear of the housing and a cutter blade extends transversely across the housing adjacent the discharge. The cutter blade may be manually actuated by a lever to upwardly sever the substrate at a desired location in conjunction with an anvil bar.

By way of example, the lower feed roll may comprise a flexible film with an adhesive coating. The upper feed roll comprises a supply of film which has an affinity for adhesive. The upper and lower films are fed between the nip rollers. The tray is placed in position and a pre-printed master such as a master containing labels repetitively printed on a sheet can be fed via the tray to the interface between the nip rollers passing between the tray surface and the wiper. Adhesive will be transferred from the bottom film to the labels with excessive adhesive being picked up by the top film. The labels are now provided with an adhesive and are attached to the lower film and may be severed from one another by the cutting blade at the discharge opening. The labels may be peeled from the film substrate when used.

Accordingly, it is a primary, and broad object of the present invention to provide a simple and efficient laminating or adhesive transfer device in which cartridges containing various transfers of films can be easily and selectively inserted for use in performing various laminating and adhesive transfer operations. The term "applicator and transfer apparatus" as used herein is to be understood to comprehend both adhesive transfer and laminating operations as the device both transfers laminates and adhesives to items.

BRIEF DESCRIPTION OF THE DRAWINGS

The above and other objects, advantages and features of the present invention will be more fully understood from the following description, claims and drawings in which:

FIG. 1 is a perspective view of the transfer apparatus of the present invention;

FIG. 2 is a perspective view of the supply roll containing a cartridge removed from the apparatus;

FIG. 3 is a sectional view taken along line 3—3 of FIG. 2;

FIG. 4 is a sectional view taken along line 4—4 of FIG 3;

FIG. 5 is an exploded view of the tensioning cap associated with the supply rolls;

FIG. 6 is a perspective view illustrating the installation of a cartridge;

FIG. 7 is a detail view of the cutter mechanism;

FIG. 8 is a side view, partly in section, showing the cartridge in place and a master being fed into the device;

FIG. 8A is a detail view of the wiper as indicated in FIG. 8;

FIG. 9 is a sectional view taken along line 9—9 of FIG. 8;

FIG. 10 is a detail view of the nip rollers;

FIG. 11 is a sectional view taken along line 11—11 of FIG. 10;

FIG. 12 is a side view showing a master being fed between the nip rollers;

FIG. 13 shows labels as they receive adhesive;

FIG. 14 is a plan view of the upper feed web showing the pick up of excessive adhesive thereon; and FIG. 15 illustrates removal of the adhesive from the lower web.

Turning now to the drawings, particularly FIGS. 1 to 11, the transfer apparatus of the present invention is generally designated by the numeral 10 and includes a housing member generally designated by the numeral 12 having a base 14, opposite side walls 16 and 18, a top 20 and a rear wall 22. The rear wall 22 of the housing is upwardly and forwardly inclined at panel 22A from the base 14 to a location where the rear wall extends vertically at panel 22B. As seen in FIG. 8, an opening 30 is defined between the panels 22A and 22B through which the substrate and processed articles are discharged.

As best seen in FIGS. 8, 9 and 10, an upper nip roller 40 extends transversely between the side walls of the frame spaced rearwardly from the edge of the side walls. The upper nip roller includes an axial shaft 42 rotatable in suitable bearings or bushings 44 at opposite ends. The shaft is covered by a cylindrical roller member 43 of resilient material such as rubber. Shaft 42 extends exteriorly of the side plate and is shown carrying a hand crank 45 for manually rotating the roller and shaft. Alternatively, the rollers may be powered by an electrical motor, not shown. A pinion gear 46 is secured to one end of the shaft adjacent the interior surfaces of the side wall.

A second nip roller 48 extends transversely between the side walls 16 and 18 positioned parallel to the upper nip roller. The lower nip roller may be vertically aligned with the upper nip roller but preferably is forwardly displaced a distance forward of the upper nip roller, as for example approximately ¼" as best seen in FIG 8. The terms "forward" and "rearward" or "front" and "rear" as used herein, refer to the orientation of the feed path through the device. The lower nip roller has a shaft 52 which is rotatable in bearings 54 located at the interior of the opposite side walls. A pinion gear 58 is mounted at one end of the shaft 52. Pinion gear 58 engages the pinion gear 46 on the upper nip shaft so that actuation of the upper nip roller by means of the crank 45 or other power means will impart opposite rotation to both nip rollers as indicated by the arrows in FIG. 10.

Feed tray 80 has of a planar feeding surface 82 with opposite extending flanges 85 which flanges are removably insertable in horizontal recesses 84 of the cartridge 150. A wiper assembly 86 is mounted on the upper surface of the feed tray as seen in FIGS. 8 and 8A. The wiper has a bar 91 which extends transversely across the tray adjacent the entrance to the nip area. The bar has a pad 87 of felt or resilient or soft material such as felt, soft plastics, fabric or rubber, which lightly engages the master as it passes between the wiper and the tray surface. The wiper serves several functions and cleans, smooths and guides the master as it enters the nip between the rollers. A particularly important function of the wiper is to tension the master substrate keeping it flat and aligned with the laminate and adhesive webs resulting in better alignment especially when feeding sheets intermittently. The wiper has an arm 89 which is upwardly biased by spring 88. Arm 89 is pivotally attached to the edge of the tray at fulcrum 93 so that the wiper is pressed into light engagement with the material passing beneath the pad 87. The wiper bar 91 may be lifted to facilitate loading a master by manually depressing the outer end of the arm 89 against the force of spring 88. Preferably the pad is replaceable as required.

Referring to FIGS. 6 and 7, a blade 90 having a cutting edge extends transversely adjacent the discharge opening. The blade is movable vertically upward from a non-actuated position to a cutting position by means of lever 95 to which the blade 90 is attached. Lever 95 is pivotally secured to the interior of the housing side wall at pivot rod 96. Downward movement of the lever at handle 97 will move the blade 90 upward into engagement with anvil bar 98 which is fixed and extends transversely. Preferably, the blade 90 is mounted on a carrier 99 by means of pins 102 having compression springs 104 thereon which bias the blade toward the cutting bar. Thus, when the cutting action occurs, the flat surface of the blade moves along the anvil which provides a self-cleaning action. The upper end of panel 22A is slightly curved at 106 as seen in FIG 8 to facilitate smooth discharge of the item being processed. The area indicated by the numeral 106 may be coated with a suitable low-frictional material such as that sold under the trademark "Teflon".

A primary advantage of the present invention is that various substrates may be provided to the user in a self-contained, ready-to-use cartridge which allows the user simply to select and insert the appropriate cartridge. As indicated above, the device of the present invention can be used for multiple purposes for adhesive transfer and lamination. Adhesive can be transferred to either surface of the master and may be a dry adhesive. The cartridge is generally designated by the numeral 150 and includes a frame having opposite side walls 152, 154, a top 156, and bottom 158. A front wall 160 defines a substantial rectangular opening 162. As shown, the cartridge includes an upper feed roll 165 and a lower feed roll 166 each containing a web of film or other flexible substrate material. A significant advantage of the present invention is that the upper and lower feed rolls are provided to the user pre-wound and properly tensioned so as not to overrun during operation and to provide proper tracking. The proper tensioning of the feed rolls is accomplished by means of a tensioning device as best seen in FIGS. 3, 4 and 5.

In FIGS. 3, 4 and 5, which figures are representative of the construction of the both ends of both feed rolls, the substrate material is shown wound about the feed roll core 200. The core 200 is a cylinder of cardboard or plastic having an end face 210. Core 200 has a hollow interior 212 which receives an end cap 215. The cap may be molded of plastic or other similar material having an interior outer wall 216. A boss 220 is concentrically formed in the cap with respect to the cylinder wall 216. Boss 220 defines an axial bore 225. The cap 215 is positioned slightly inwardly of the end of the core and may be adhesively secured to the interior wall 212 of the roll core 200.

A circular end plate 230 abuts the end of the core which plate has a diameter slightly greater than the diameter of the core. The end plate has a central aperture 240 which receives the threaded shaft of bolt 246. A spring 250 is interposed between the head of the bolt and the interior face of the cap 215. Nut 252 engages the threaded end of the bolt. The head of the bolt 246 bears against the exposed surface of the end plate 230 and the position of the nut along the shaft of the bolt determines the frictional resistance that exists between the interior surface of the end plate 230 and the end face of the core of the roller. This tension is pre-adjusted by the manufacturer to provide the proper roll tension depending upon the type of material on the roll, the size of the material, the thickness of the material and other factors. Mounting tabs 260 and 260A project outwardly from the end plate and are slidingly engageable in mounting slots 270, 270A and 272, 272A provided on the interior surfaces of the cartridge side walls.

Thus, it will be seen that inserting a supply of suitable feed substrate is easily accomplished. The user simply selects the appropriate cartridge 150 and positions the cartridge in the opening at the front side of the housing. The cartridge is locked in place in the housing in a vertical position locking detent members 280. The feed rolls may be various types of stock such as clear laminates, paper or film for removing excessive adhesive or rolls of material having a loose adhesive coating and a release coating on the opposite surface. The feed tray 80 is inserted in a generally horizontal position in the opposite slots in the cartridge.

As mentioned above, the device may be used as a lamination device or as an adhesive transfer device. In the case of use as an adhesive transfer device, the lower feed roll which consists of a film carrying an easily transferable adhesive. The upper feed roll would typically be a web of flexible carrier material having release characteristics on a lower surface and adhesive coating on the other surface. With rolls of this type in position, the end of the web of the lower feed roll is extended over the lower nip roller. The upper feed roll, in the case of adhesive transfer, will consist of a web of material such as inexpensive paper or film, having an affinity for adhesive. The end of the web is extended between the nip rollers with the end of the web adhesively secured to the web of the master in the lower roll.

Referring to FIGS. 11 to 15, the master which is designated by the numeral 300 consists of a continuous sheet of material having an upper surface and a lower surface. The upper surface carries labels 310 which have been pre-printed. Obviously, the master can be any pre-printed document or series of documents which can be generated by the user, as for example on a computer. The labels 310 can be of varying size and shape and it is understood that the term "labels" as used herein is intended to be representative of printed materials of various types arranged on a flexible substrate.

The master is aligned on the feed tray with the leading free edge of the master positioned on the exposed adhesive surface of the lower feed stock material. 166 at the nip roller interface. The slight forward protrusion of the lower nip roller 48 facilitates securing the master at this location. The web 165 of the upper feed roller is fed from the cartridge to the nip roller interface on the upper side of master 300.

The operator then actuates the machine by operating the crank which will rotate the upper nip roller and by means of the inter-engaging pinion gears, cause rotation of the lower nip roller. The rotation will also advance the upper web, the lower web and the master. The master is smoothed, guided and wiped clean as it passes between the wiper 86 and the upper surface of the tray. As the master proceeds between the nip rollers in the interface nip area, the exposed adhesive 325 from the lower web will be transferred to the lower surface of the master 300. The upper web 165 will pick up any excessive adhesive not transferred to the master, as for example adhesive in the areas outside the perimeter of the label areas 310. The upper web should be wider than the adhesive web. The master may then be easily severed into individual labels or strips of labels by operating the cutter by means of the lever as the master emerges from the discharge opening at the rear of the machine.

Note that the master can be oriented with either printing or indicia facing upwardly or downwardly depending on the user's requirements.

For example, if the user is making labels which are to be applied to the inside of a window, the master would, in most cases, be fed into the applicator with the printing disposed downwardly so adhesive would be applied over the printed area 310. The apparatus can apply lamination to either top or bottom surfaces of a substrate or adhesive to the top or bottom surfaces of a substrate or to both surfaces. The device can also perform combination operations in applying of both the laminate and an adhesive to a substrate, the operation being determined by the selection of the cartridge and feed rolls within the cartridge that are inserted into the apparatus.

The characteristics of the lower web are such that the adhesive is a nonaggressive adhesive loosely adhered to the surface of the web. Thus, the lower web serves as a peelable cover which can be stripped away at the time the master is to be used by adhesively applying the master to a surface.

One significant advantage of the present invention is that the upper and lower feed rolls may be provided to the user pre-wound and properly tensioned so as not to overrun during operation. The proper tensioning is pre-set by the tensioning device described above.

While the principles of the invention have been made clear in the illustrative embodiments set forth above, it will be obvious to those skilled in the art to make various modifications to the structure, arrangement, proportion, elements, materials and components used in the practice of the invention. To the extent these various modifications do not depart from the spirit and scope of the appended claims, they are intended to be encompassed therein.

I claim:

1. An applicator and transfer apparatus comprising:

a frame having opposite sides;

a first nip roller rotatably mounted in said frame;

a second nip roller rotatably mounted in said frame parallel to said first nip roller and defining a nip area with said first nip roller, said nip area having a feed side and a discharge side;

actuating means for imparting rotation to at least one of said first and second nip rollers;

first and second feed rolls of material, said first and second feed rolls each having opposite ends and a generally cylindrical core about which feed material is wound;

first mounting means for rotatably mounting said first feed roll therein parallel to said first and second nip rollers and second mounting means for rotatably mounting said second feed roll therein parallel to said first and second nip rollers; and a removable cartridge insertable in said housing, wherein said first and second mounting means are located in said cartridge;

wherein said frame includes an open front for receiving said cartridge and a rear wall, said rear wall having an opening therein in alignment with said nip area, and wherein said cartridge includes an open rear in substantial alignment with said open front of said frame, a top wall, a bottom wall, and a from wall, said open rear providing access to said first and second feed rolls and loading of material from said first and second feed rolls to said first and second nip rollers, and said front wall having an opening therein in alignment with said nip area.

2. The applicator and transfer apparatus of claim 1, further comprising pre-tensioning means associated with each of said cores for selectively establishing a predetermined resistance to rotation of the rolls of material to provide the proper application tension for unwinding the feed material.

3. The applicator and transfer apparatus of claim 2, wherein said pre-tensioning means includes a tensioning cap affixed to said cores, said caps having an end plate engaging the end of the associated core and said plate having engagement means for engagement with said mounting means and further including biasing means for applying a predetermined force biasing said end plate into engagement with the end of said roll core.

4. The applicator and transfer apparatus of claim 1, further comprising a feed tray insertable in said cartridge and extending generally horizontally from said nip area when inserted therein.

5. The applicator and transfer apparatus of claim 1, further comprising cut-off means located adjacent the rear of the nip rollers at the discharge side.

6. The applicator and transfer apparatus of claim 5, wherein the cut-off means includes an anvil bar, a transversely-extending blade having a cutting edge, and a lever operatively attached to said cutting blade for moving said cutting blade into engagement with said anvil bar.

7. The applicator and transfer apparatus of claim 1, wherein said nip rollers are parallel to one another and wherein one of said nip rollers is displaced toward the feed side of the nip area relative to the other of said nip rollers.

8. The applicator and transfer apparatus of claim 1, wherein said material on said first and second feed rolls is a laminate.

9. The applicator and transfer apparatus of claim 1, wherein one of said feed rolls contains a feed material comprising a release coated substrate having an adhesive coating and the other of said feed rolls contains a feed material comprising a substrate having an affinity for the adhesive, whereby upon contact the adhesive will be transferred from the one feed roll to the other feed roll.

10. The applicator and transfer apparatus of claim 1, wherein said frame has a low friction surface at the discharge side of the nip area.

11. The applicator and transfer apparatus of claim 1, further comprising a wiper extending transversely of said tray for smoothing, guiding, and tensioning the master.

12. The applicator and transfer apparatus of claim 1, wherein said wiper includes a resilient surface, and wherein said wiper surface is biased into contact with said feed tray.

13. The applicator and transfer apparatus of claim 12, wherein said resilient surface is a soft material selected from the group consisting of rubber, plastic, and fabric.

14. The applicator and transfer apparatus of claim 12, further comprising an arm pivotal with respect to said tray and a bar carried on said arm, said wiper being mounted on said bar.

15. The applicator and transfer apparatus of claim 1, further comprising a feed tray insertable in said opening in said rear wall of said cartridge and extending generally horizontally from said nip area when inserted therein.

16. The applicator and transfer apparatus of claim 1, wherein said frame further includes a pair of opposite side walls, and wherein said cartridge is dimensioned to fit between said walls when inserted into said open front of said frame.

* * * * *